United States Patent
Walker

(10) Patent No.: US 12,297,740 B2
(45) Date of Patent: May 13, 2025

(54) SEAL CARRIER WITH ROLLING ELEMENT GUIDE RAIL CONTACT

(71) Applicant: Raytheon Technologies Corporation, Farmington, CT (US)

(72) Inventor: Brady L. Walker, Glastonbury, CT (US)

(73) Assignee: RTX CORPORATION, Farmington, CT (US)

(*) Notice: Subject to any disclaimer, the term of this patent is extended or adjusted under 35 U.S.C. 154(b) by 127 days.

(21) Appl. No.: 18/220,220

(22) Filed: Jul. 10, 2023

(65) Prior Publication Data

US 2025/0020067 A1    Jan. 16, 2025

(51) Int. Cl.
*F01D 11/00* (2006.01)
*F02C 7/28* (2006.01)

(52) U.S. Cl.
CPC .......... *F01D 11/001* (2013.01); *F01D 11/003* (2013.01); *F02C 7/28* (2013.01); *F05D 2220/32* (2013.01); *F05D 2240/55* (2013.01)

(58) Field of Classification Search
CPC .......... F16J 15/00; F16J 15/08; F16J 15/0806; F16J 15/16; F16J 15/50; F16J 15/52; F02C 7/00; F02C 7/28; F05D 2220/32; F05D 2220/321; F05D 2220/3212; F05D 2220/3213; F05D 2220/3215; F05D 2220/3216; F05D 2220/3217; F05D 2220/3218; F05D 2220/3219; F05D 2240/55; F01D 11/001; F01D 11/003
See application file for complete search history.

(56) References Cited

U.S. PATENT DOCUMENTS

| | | | | |
|---|---|---|---|---|
| 4,687,346 A | * | 8/1987 | Suciu | F16J 15/3464 415/113 |
| 8,714,557 B2 | * | 5/2014 | Miller | F16J 15/3472 277/377 |
| 9,546,560 B2 | * | 1/2017 | Larson | F16J 15/3436 |
| 11,453,090 B2 | | 9/2022 | Bowler | |
| 11,624,439 B2 | * | 4/2023 | Nasman | F16J 15/08 277/637 |
| 2016/0032840 A1 | * | 2/2016 | James | F16C 19/525 415/170.1 |
| 2019/0040957 A1 | * | 2/2019 | Miller | F16J 15/3452 |
| 2020/0386168 A1 | | 12/2020 | Nasman et al. | |
| 2020/0386318 A1 | | 12/2020 | Nasman et al. | |
| 2021/0332888 A1 | | 10/2021 | Nasman et al. | |
| 2021/0332889 A1 | * | 10/2021 | Nasman | F16C 33/1045 |

FOREIGN PATENT DOCUMENTS

WO    2016042233 A1    3/2016

OTHER PUBLICATIONS

EP Search Report for EP Patent Application No. 24187873.5 dated Dec. 3, 2024.

* cited by examiner

*Primary Examiner* — Matthew T Largi
(74) *Attorney, Agent, or Firm* — Getz Balich LLC

(57) ABSTRACT

An assembly is provided for rotational equipment. This assembly includes a guide rail, a seal carrier, a seal element and a seal land. The seal carrier is mated with and is configured to translate along the guide rail. The seal carrier includes a rolling element configured to engage and roll against the guide rail as the seal carrier translates along the guide rail. The seal element is mounted to the seal carrier. The seal land is configured to rotate about an axis. The seal element is configured to sealingly engage the seal land.

20 Claims, 12 Drawing Sheets

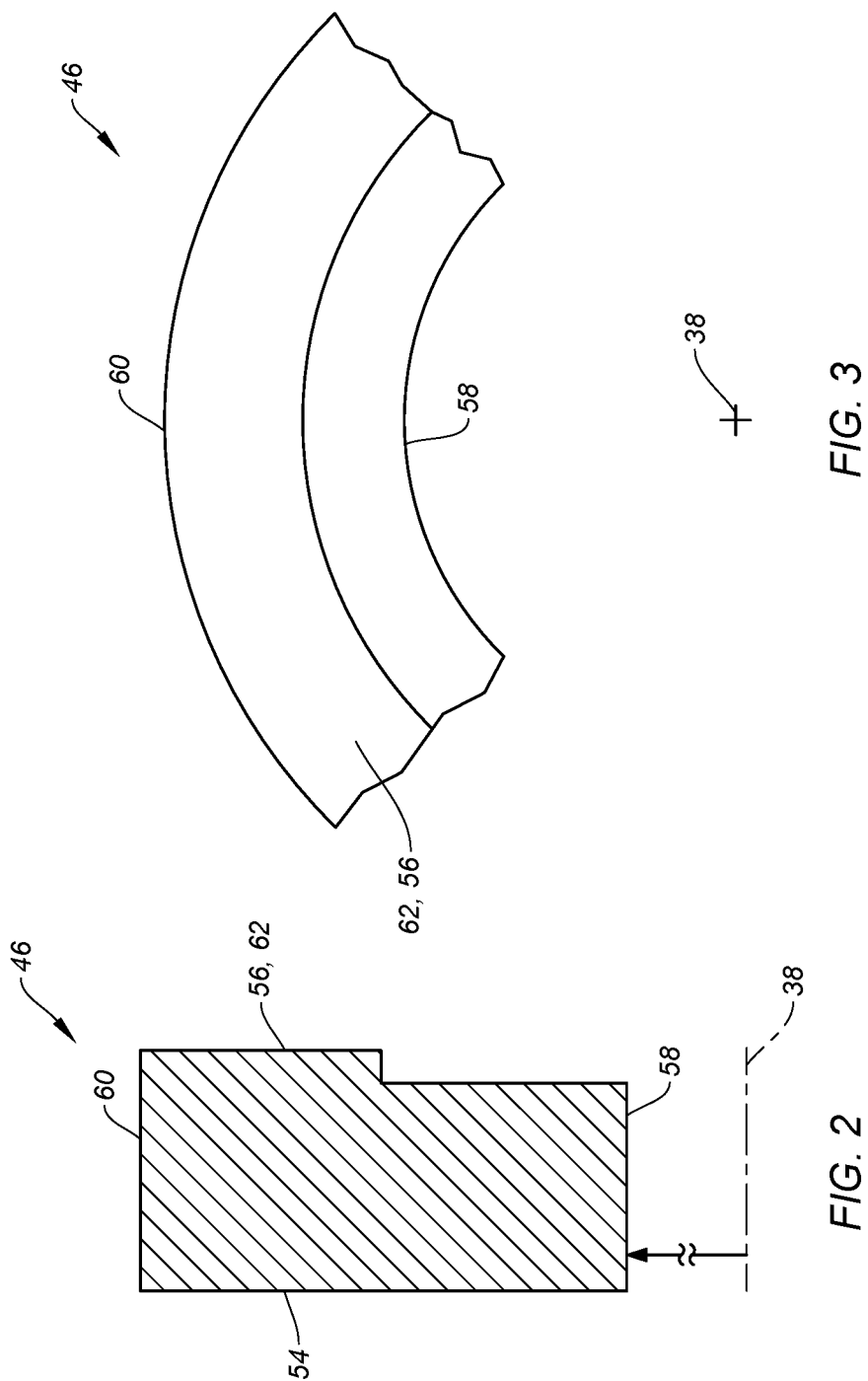

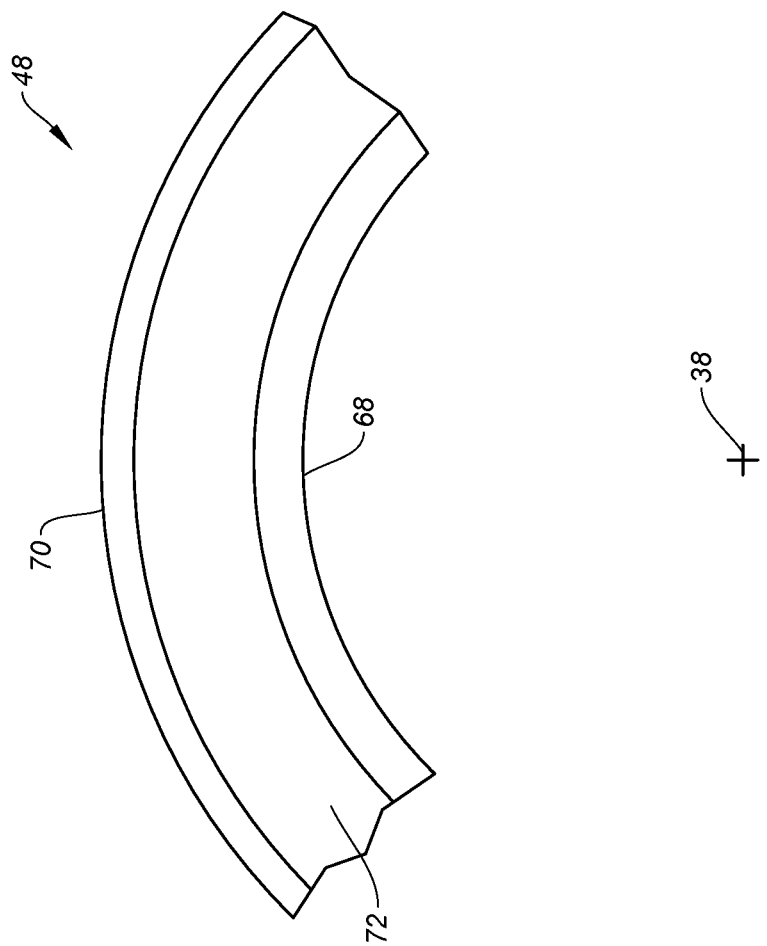
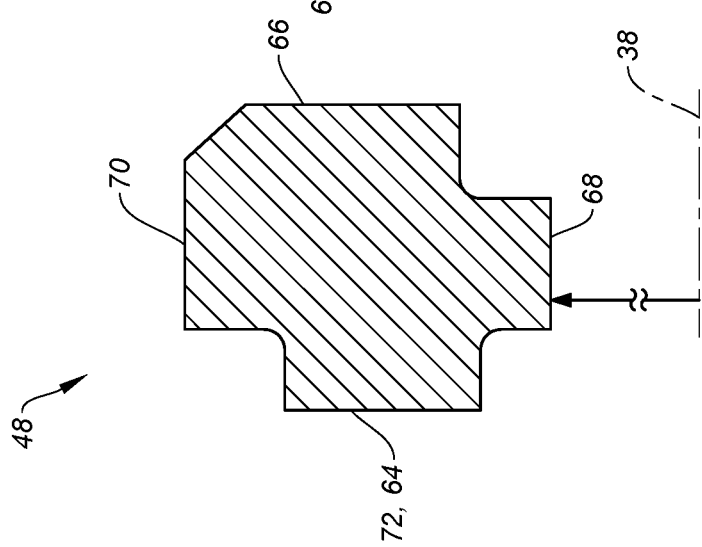

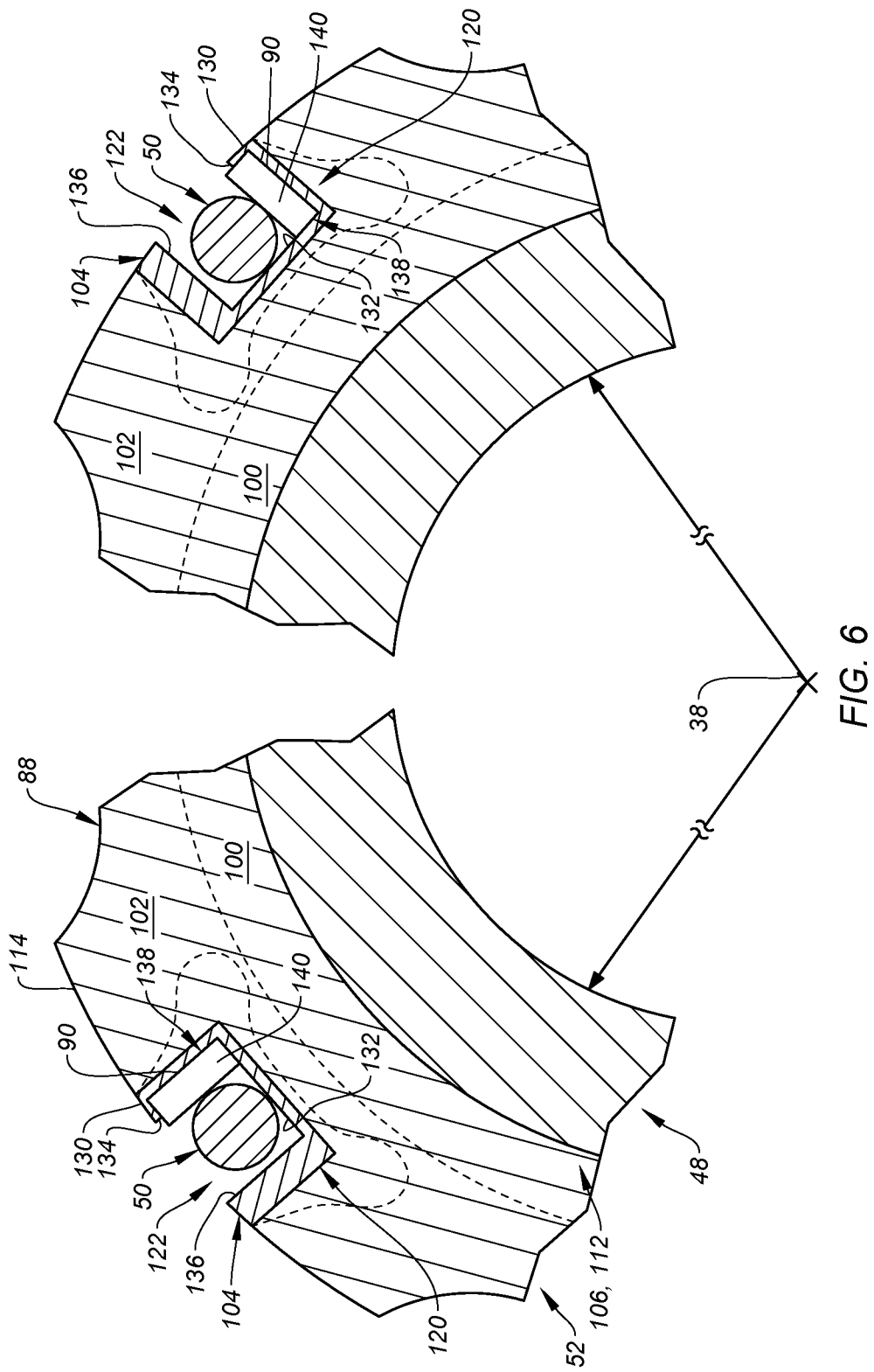

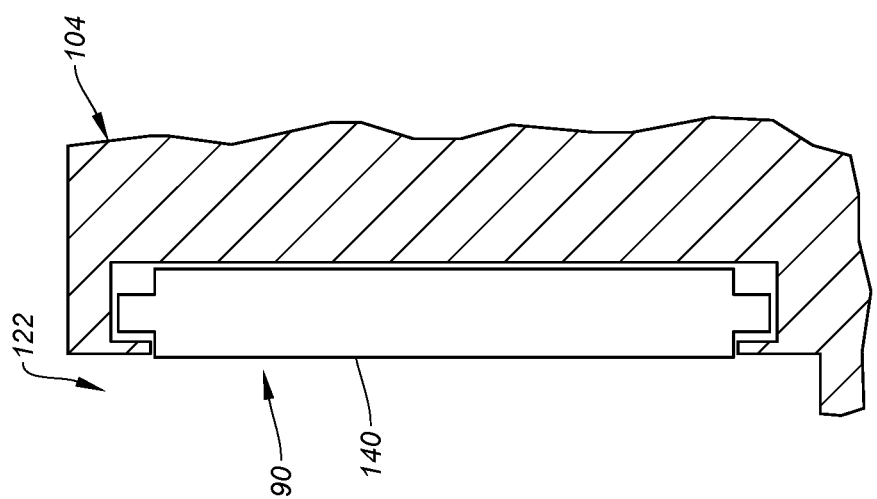
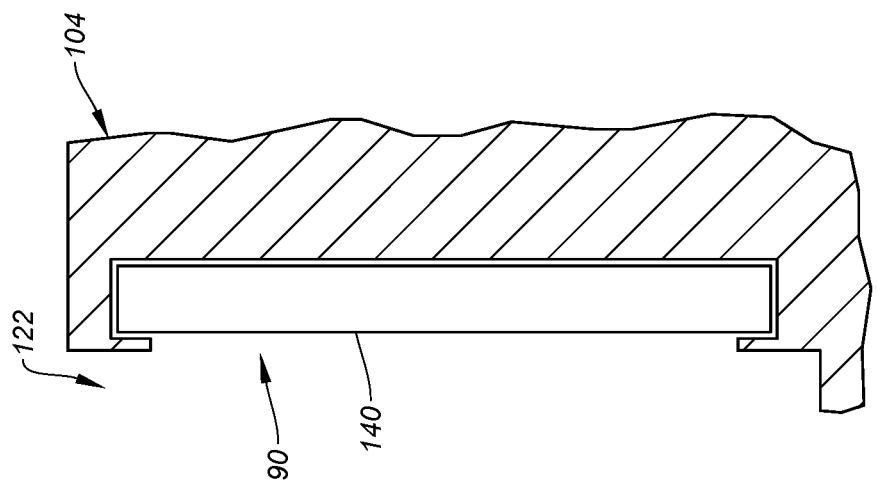

SEAL CARRIER WITH ROLLING ELEMENT GUIDE RAIL CONTACT

BACKGROUND OF THE DISCLOSURE

1. Technical Field

This disclosure relates generally to rotational equipment and, more particularly, to a seal assembly for the rotational equipment.

2. Background Information

Rotational equipment such as a gas turbine engine includes numerous seal assemblies to seal gaps between rotating and stationary components. Various types and configurations of seal assemblies are known in the art. While these known seal assemblies have various benefits, there is still room in the art for improvement. For example, there is a need in the art for a seal assembly with reduced seal carrier wear.

SUMMARY OF THE DISCLOSURE

According to an aspect of the present disclosure, an assembly is provided for rotational equipment. This assembly includes a guide rail, a seal carrier, a seal element and a seal land. The seal carrier is mated with and is configured to translate along the guide rail. The seal carrier includes a rolling element configured to engage and roll against the guide rail as the seal carrier translates along the guide rail. The seal element is mounted to the seal carrier. The seal land is configured to rotate about an axis. The seal element is configured to sealingly engage the seal land.

According to another aspect of the present disclosure, another assembly is provided for rotational equipment. This assembly includes a guide rail, a seal carrier, a seal element and a seal land. The seal carrier extends circumferentially about an axis. The seal carrier includes a rolling element bearing. The seal carrier is mated with the guide rail through the rolling element bearing. The seal carrier is configured to translate axially along the guide rail. The seal element extends circumferentially about the axis. The seal element is mounted to the seal carrier. The seal land extends circumferentially about and is configured to rotate about the axis. The seal element is configured to axially engage the seal land.

According to still another aspect of the present disclosure, another assembly is provided for rotational equipment. This assembly includes a seal carrier and a seal element. The seal carrier extends circumferentially around an axis. The seal carrier includes a receptacle, a plurality of slots, a base, a flange, a plurality of mounts and a plurality of rolling elements. The receptacle extends axially into the base. The slots are arranged circumferentially about the axis. Each of the slots extends axially through the flange. The flange projects radially out from the base in a direction away from the axis. Each of the mounts is fixed to the flange and rotatably supports a respective one of the rolling elements. Each of the rolling elements projects partially laterally into a respective one of the slots. The seal element extends circumferentially around the axis. The seal element is seated in the receptacle and fixed to the base.

The assembly may also include a plurality of guide rails. Each of the guide rails may project axially through a respective one of the slots. Each of the guide rails may laterally contact a respective one of the rolling elements. The rolling elements may be configured to guide axial translation of the seal carrier along the guide rails.

The assembly may also include a bladed rotor, a rotating structure and a seal land. The rotating structure may be coupled to and rotatable with the bladed rotor. The seal land may be mounted onto the rotating structure. The seal element may be configured to axially engage and form a seal with the seal land.

The rolling element bearing may include a cylindrical rolling element configured to engage and roll against a lateral side of the guide rail.

The rolling element bearing may include a cylindrical rolling element configured to engage and roll against a lateral side of the guide rail.

The rolling element may be configured as or otherwise include a cylindrical rolling element.

The rolling element may be configured as or otherwise include a needle rolling element.

The rolling element may be disposed to a circumferential side of the guide rail about the axis.

The seal carrier may also include a carrier body and an aperture. The rolling element may be rotatably attached to the carrier body. The seal element may be fixedly attached to the carrier body. The guide rail may project axially through the aperture along the axis.

The carrier body may include a base and a flange projecting radially out from the base. The aperture may extend axially through the flange along the axis.

The carrier body may also include a mount. The mount may rotatably support the rolling element. The mount may be fixedly attached to the flange.

The mount may form the aperture through the flange.

The mount may include a channel. The flange may project radially into and may be seated in the channel.

The aperture may be configured as or otherwise include a slot. The slot may extend axially through the carrier body along the axis. The slot may project radially into the carrier body towards the axis. The slot may extend laterally within the carrier body.

A bearing surface of the rolling element mat project laterally into the aperture. The bearing surface may be configured to laterally contact the guide rail.

The bearing surface may be a cylindrical surface of the rolling element.

The guide rail may be disposed laterally between the rolling element and a side surface of the carrier body. The guide rail may be operable to laterally contact the side surface of the carrier body.

The assembly may also include a plurality of guide rails which include the guide rail. The guide rails may be arranged circumferentially about the axis. The seal carrier may be mated with and configured to translate along the guide rails. The seal carrier may also include a plurality of rolling elements. The rolling elements may include the rolling element. Each of the rolling elements may be configured to engage and roll against a respective one of the guide rails as the seal carrier translates along the guide rails.

The seal element may be configured as or otherwise include a carbon seal element.

The assembly may also include a spring element engaging the seal carrier and configured to bias the seal element against the seal land.

The assembly may also include a stationary structure of an engine and a rotating structure of the engine. The guide rail may be fixed to the stationary structure. The seal land may be fixed to the rotating structure. The rotational equipment may be configured as or otherwise include the engine.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 2 is a partial side sectional illustration of a seal land.

FIG. 3 is a partial end view of the seal land.

FIG. 4 is a partial side sectional illustration of a seal element.

FIG. 5 is a partial end view illustration of the seal element.

FIG. 6 is a broken cross-sectional illustration of a portion of the assembly of FIG. 1.

FIGS. 14A and 14B are partial sectional illustrations of the assembly with various needle rolling element arrangements.

DETAILED DESCRIPTION

Figure 1:
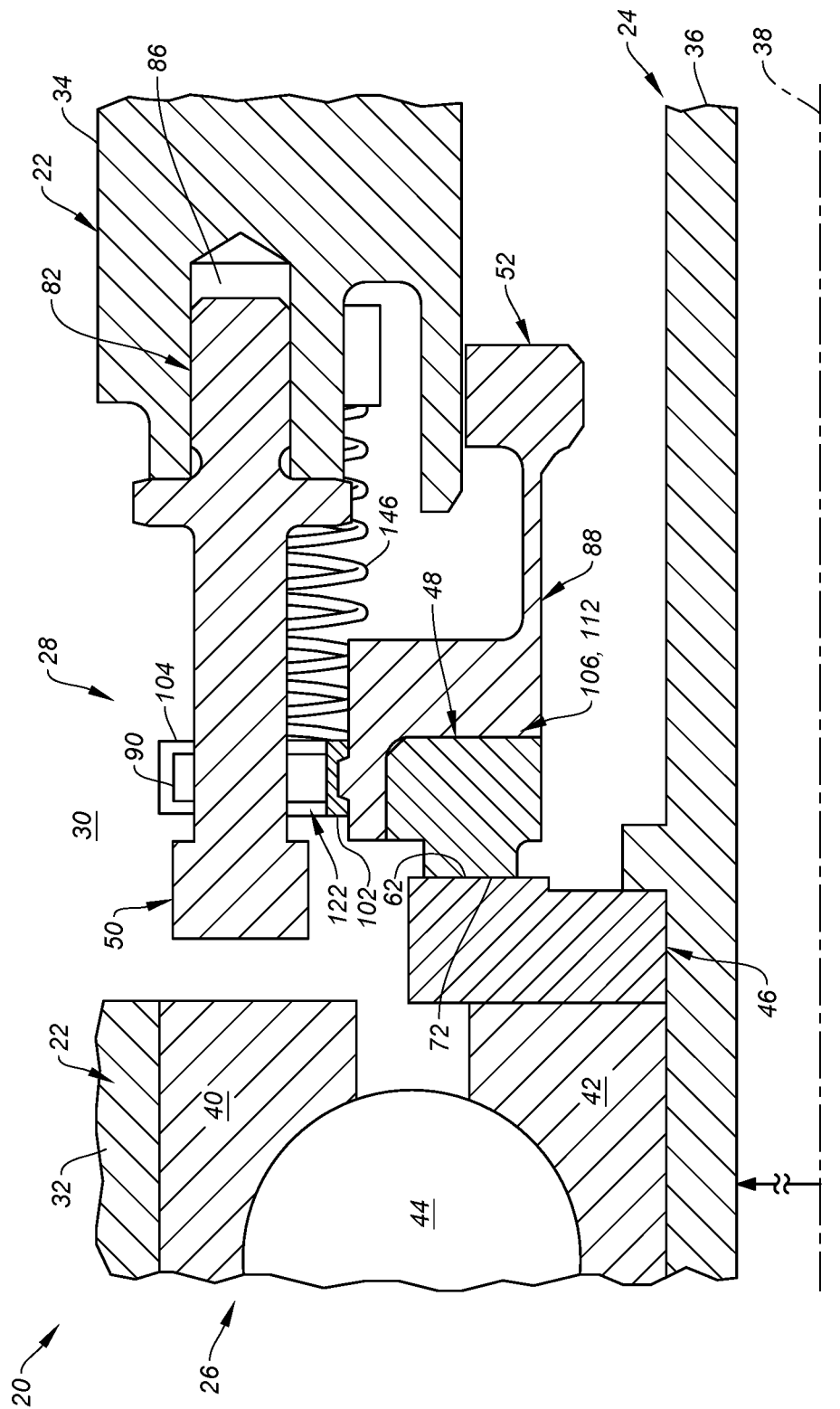
FIG. 1 is a partial side sectional illustration of an assembly for rotational equipment such as a gas turbine engine.

FIG. 1 is a partial side sectional illustration of an assembly 20 for a piece of rotational equipment. The rotational equipment may be configured as a gas turbine engine for an aircraft propulsion system such as, but not limited to, a geared or direct-drive turbofan gas turbine engine. However, the assembly 20 of the present disclosure is not limited to such an aircraft application nor a gas turbine engine application. The assembly 20, for example, may alternatively be configured with rotational equipment such as an industrial gas turbine engine, a rotary engine (e.g., a Wankel cycle engine), a reciprocating piston internal combustion (IC) engine, a wind turbine, a water turbine or any other apparatus which includes a seal assembly for sealing a gap between a rotating component and a stationary component.

The assembly 20 of FIG. 1 includes a stationary structure 22, a rotating assembly 24 and at least one bearing 26 for rotatably supporting the rotating assembly 24 relative to the stationary structure 22. The assembly 20 of FIG. 1 also includes a seal assembly 28 configured to seal an annular gap between the rotating assembly 24 and the stationary structure 22.

The stationary structure 22 is configured as a stationary part of the rotational equipment. The stationary structure 22 of FIG. 1, for example, is configured to at least partially form an internal bearing compartment 30 for housing at least the bearing 26. This stationary structure 22 includes a bearing support 32 such as, but not limited to, a frame. The stationary structure 22 also includes a seal assembly support 34; e.g., an annular wall.

The rotating assembly 24 of FIG. 1 includes at least a rotating structure 36. The rotating assembly 24 and its rotating structure 36 are each configured to rotate about an axial centerline 38, which centerline 38 may be a centerline axis and/or a central rotational axis of the rotational equipment. The rotating structure 36 of FIG. 1 is configured as a tubular shaft. However, in other embodiments, the rotating structure 36 may be configured as another component (e.g., a sleeve) mounted to and rotatable with a shaft of the rotational equipment, or any other rotor within the rotational equipment. The rotating structure 36 of FIG. 1 extends axially along the axial centerline 38 through (or partially into or within) the stationary structure 22. The stationary structure 22 of FIG. 1 thereby extends circumferentially about (e.g., completely around) the axial centerline 38 and the rotating assembly 24 and its rotating structure 36.

The bearing 26 may be configured as a roller element bearing. The bearing 26 of FIG. 1, for example, includes an annular outer race 40, an annular inner race 42 and a plurality of bearing elements 44; e.g., cylindrical or spherical elements. The outer race 40 circumscribes the inner race 42 and the bearing elements 44. The outer race 40 is mounted and fixed to the stationary structure 22 and, more particularly, the bearing support 32. The inner race 42 circumscribes and is mounted and fixed to the rotating structure 36. The bearing elements 44 are arranged in an annular array about the axial centerline 38, which array is radially between and engaged with the outer race 40 and the inner race 42. The present disclosure, however, is not limited to the foregoing exemplary bearing configuration. For example, in other embodiments, the bearing 26 may alternatively be configured as a journal bearing or any other type of bearing utilized in the rotational equipment.

The seal assembly 28 of FIG. 1 is configured to seal the gap which extends (e.g., radially and/or axially) between the stationary structure 22 and the rotating structure 36. Of course, in other embodiments, the seal assembly 28 may seal a gap extending between the stationary structure 22 and another rotating component mounted to and/or rotatable with the rotating structure 36.

The seal assembly 28 of FIG. 1 includes an annular (e.g., rotatable) seal land 46 and an annular (e.g., non-rotatable, stationary) seal element 48; e.g., a carbon seal element. The seal assembly 28 of FIG. 1 also includes one or more guide rails 50 and a seal carrier 52.

Referring to FIGS. 2 and 3, the seal land 46 extends circumferentially about (e.g., completely around) the axial centerline 38. The seal land 46 may thereby be configured with a full hoop body. Referring to FIG. 2, the seal land 46 extends axially along the axial centerline 38 between an axial first end 54 of the seal land 46 and an axial second end 56 of the seal land 46. The seal land 46 extends radially between a radial inner side 58 of the seal land 46 and a radial outer side 60 of the seal land 46.

The seal land 46 includes an annular (e.g., radially extending) seal land surface 62 located at (e.g., on, adjacent or proximate) the seal land second end 56. This seal land surface 62 may be a substantially uninterrupted surface; see also FIG. 3. The seal land surface 62, for example, may be a flat planar surface configured without (e.g., circumferential and/or radial) interruptions such as, but not limited to, channels, slots and apertures. Of course, in other embodiments, the seal land surface 62 may be (e.g., circumferentially and/or radially) interrupted by one or more channels, slots, apertures and/or other types of surface interruptions.

Referring to FIG. 1, the seal land 46 is arranged with the rotating structure 36 in such a manner so as to be rotatable with the rotating structure 36 about the axial centerline 38. The seal land 46 of FIG. 1, for example, circumscribes and is fixedly mounted to the rotating structure 36.

Referring to FIGS. 4 and 5, the seal element 48 extends circumferentially about (e.g., completely around) the axial centerline 38. The seal element 48 may thereby be configured with a full hoop body. This full hoop body may be a single unitary body; e.g., a monolithic body. Alternatively, the full hoop body may be a segmented body; e.g., the seal element 48 may be configured from an array of arcuate seal element segments. Referring to FIG. 4, the seal element 48 extends axially along the axial centerline 38 between an axial first end 64 of the seal element 48 and an axial second end 66 of the seal element 48. The seal element 48 extends radially between a radial inner side 68 of the seal element 48 and a radial outer side 70 of the seal element 48.

The seal element 48 includes an annular (e.g., radially extending) seal element surface 72 located at the seal element first end 64. This seal element surface 72 is a substantially uninterrupted surface; see also FIG. 5. The seal element surface 72, for example, may be a flat planar surface configured without (e.g., circumferential and/or radial) interruptions such as, but not limited to, channels, slots and apertures. Of course, in other embodiments, the seal element surface 72 may be (e.g., circumferentially and/or radially) interrupted by one or more channels, slots, apertures and/or other types of surface interruptions.

Figure 7:
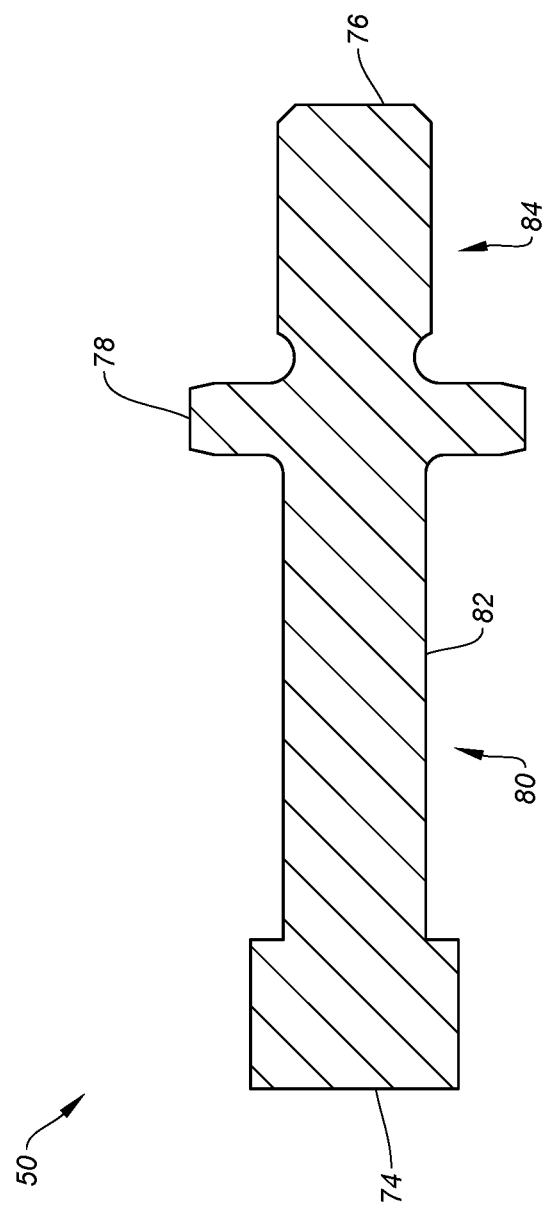
FIG. 7 is a side sectional illustration of a guide rail.

Referring to FIG. 6, the guide rails 50 are arranged circumferentially about the axial centerline 38 in an array; e.g., a circular array. Referring to FIG. 7, each of the guide rails 50 may be configured as or otherwise include a guide pin. For example, each guide rail 50 of FIG. 7 may have, but is not limited to, a generally cylindrical body that extends axially between an axial first end 74 of the guide rail 50 and an axial second end 76 of the guide rail 50. A generally annular flange 78 may project out from and circumscribes the guide rail body. This flange 78 may be configured with a polygonal (e.g., hexagonal) peripheral cross-sectional geometry adapted for mating with an installation tool such as, but not limited to, a wrench or a socket. An axial first portion 80 of the guide rail body, axially between the guide rail first end 74 and the flange 78, may be configured with a smooth cylindrical surface 82. An axial second portion 84 of the guide rail body, axially between the guide rail second end 76 and the flange 78, may be configured with threads; e.g., the portion 84 is a threaded portion.

Referring to FIG. 1, the guide rails 50 are fixedly mounted to the stationary structure 22. For example, the threaded portion 84 of each guide rail 50 may be screwed into a corresponding tapped hole 86 in the stationary structure 22. Each guide rail 50 is thereby connected to the stationary structure 22 by a threaded interface. However, in other embodiments, one, some or all of the guide rails 50 may alternatively each be connected to the stationary structure 22 through staking, riveting, etc.

The seal carrier 52 is configured to translate axially along the guide rails 50. The seal carrier 52 is also configured to support the seal element 48. The seal carrier 52 of FIG. 1, for example, includes a carrier body 88 and one or more rolling elements 90.

Figure 8:
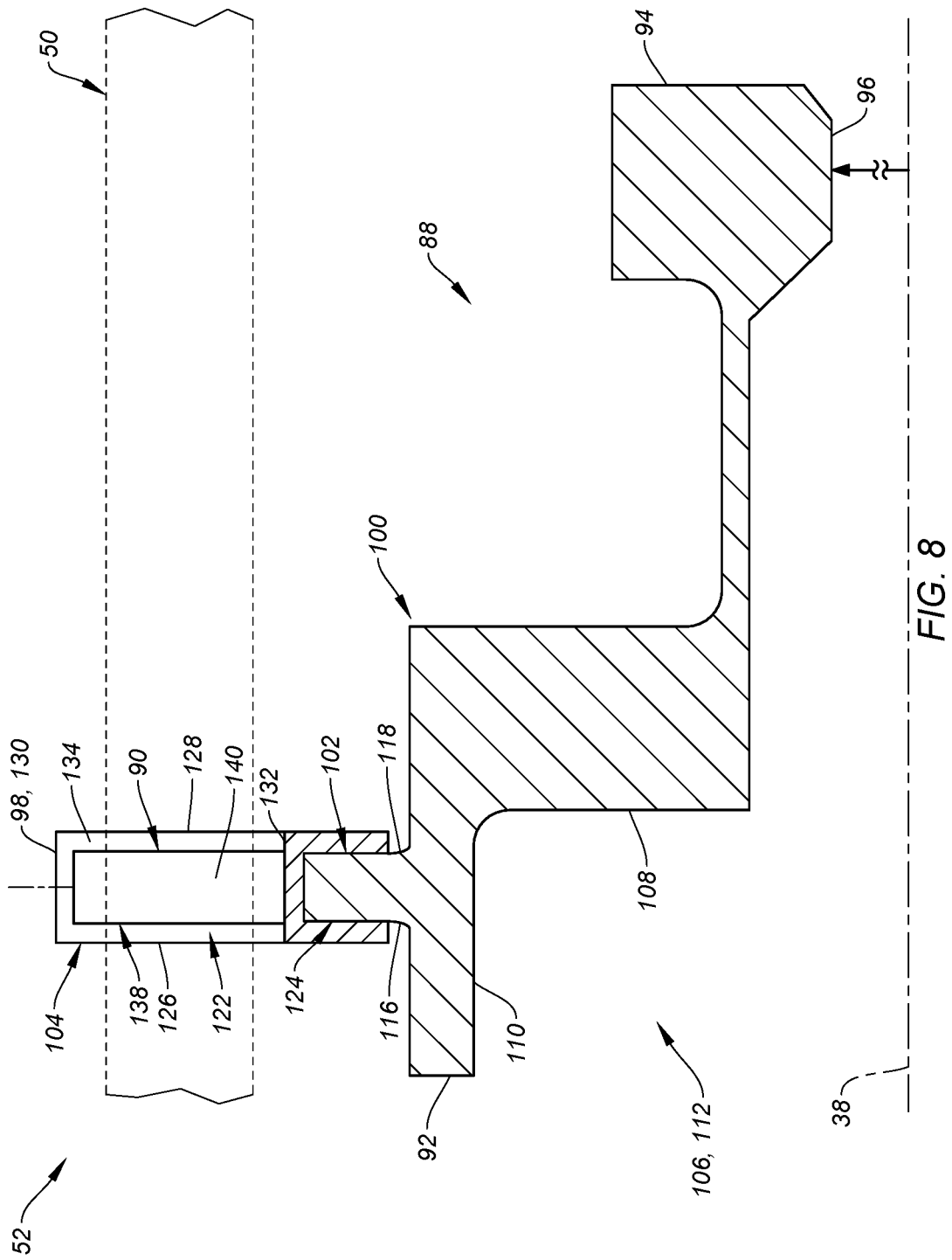
FIG. 8 is a partial first side sectional illustration of a seal carrier with a portion of the guide rail in dashed line form.
Figure 9:
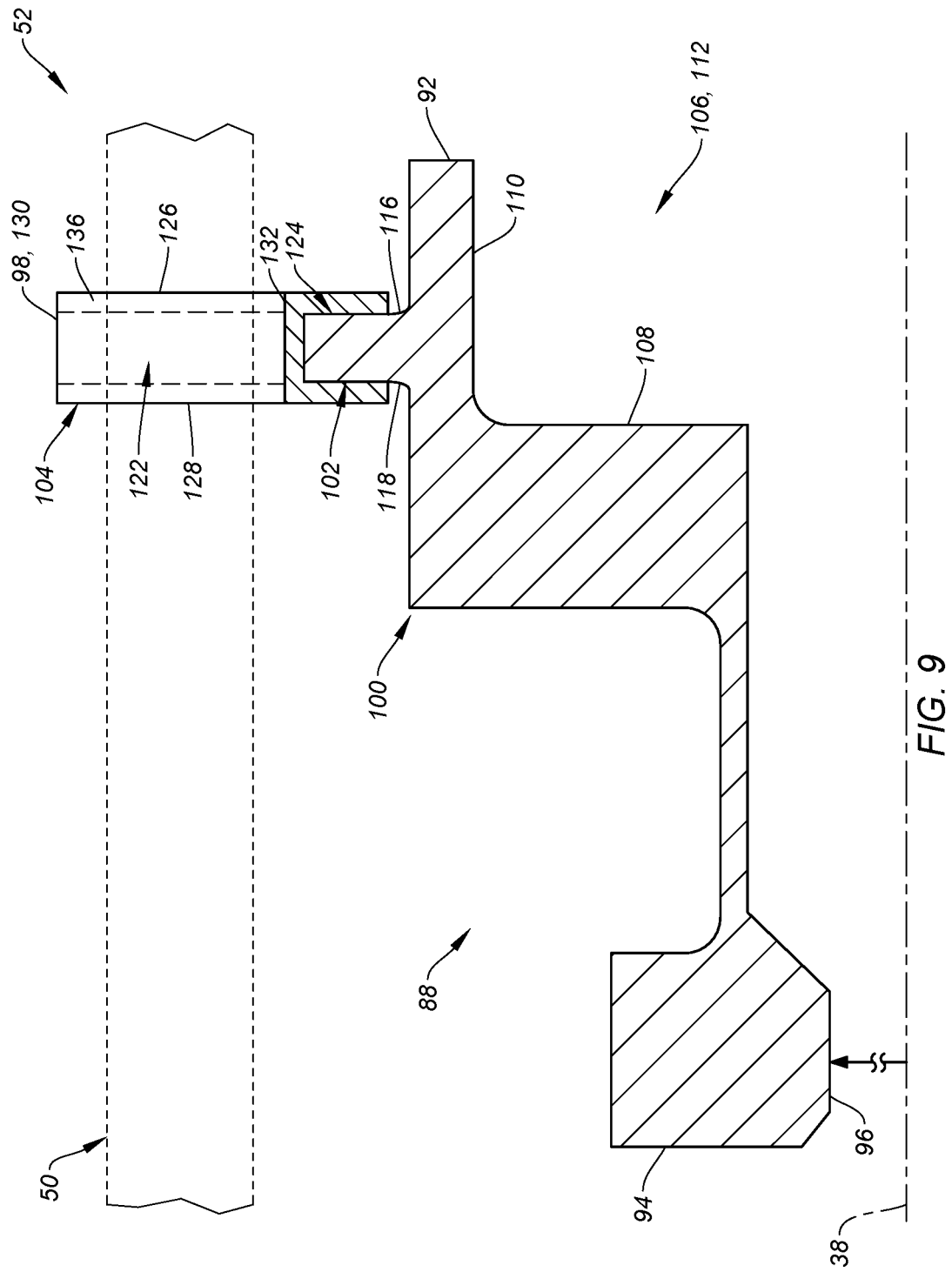
FIG. 9 is a partial second side sectional illustration of the seal carrier with a portion of the guide rail in dashed line form.

Referring to FIG. 6, the seal carrier 52 and its carrier body 88 extend circumferentially about (e.g., completely around) the axial centerline 38. The seal carrier 52 and its carrier body 88 may thereby be configured with a full hoop body. Referring to FIGS. 8 and 9, the seal carrier 52 and its carrier body 88 extend axially along the axial centerline 38 between an axial first end 92 of the seal carrier 52 and an axial second end 94 of the seal carrier 52. The seal carrier 52 and its carrier body 88 extend radially between a radial inner side 96 of the seal carrier 52 and a radial outer side 98 of the seal carrier 52. The carrier body 88 of FIGS. 8 and 9 includes a seal carrier base 100 and a seal carrier flange 102 (or alternatively multiple flanges). This carrier body 88 also includes one or more rolling element mounts 104 for rotatably supporting and mounting the rolling elements 90 with the carrier body 88.

The carrier base 100 is configured with a carrier recess 106; e.g., an annular notch. This carrier recess 106 extends axially partially into the carrier body 88 and its carrier base 100 from the seal carrier first end 92 to an axial end surface 108 of the carrier base 100, which axial end surface 108 forms an axial end of the carrier recess 106. The carrier recess 106 extends radially (e.g., in a radial outward direction away from the axial centerline 38) partially into the carrier body 88 and its carrier base 100 from (or about) the seal carrier inner side 96 to a radial side surface 110 of the carrier base 100, which radial side surface 110 forms a radial side of the carrier recess 106. The carrier recess 106 extends circumferentially within the carrier base 100 about (e.g., completely around) the axial centerline 38.

Figure 10:
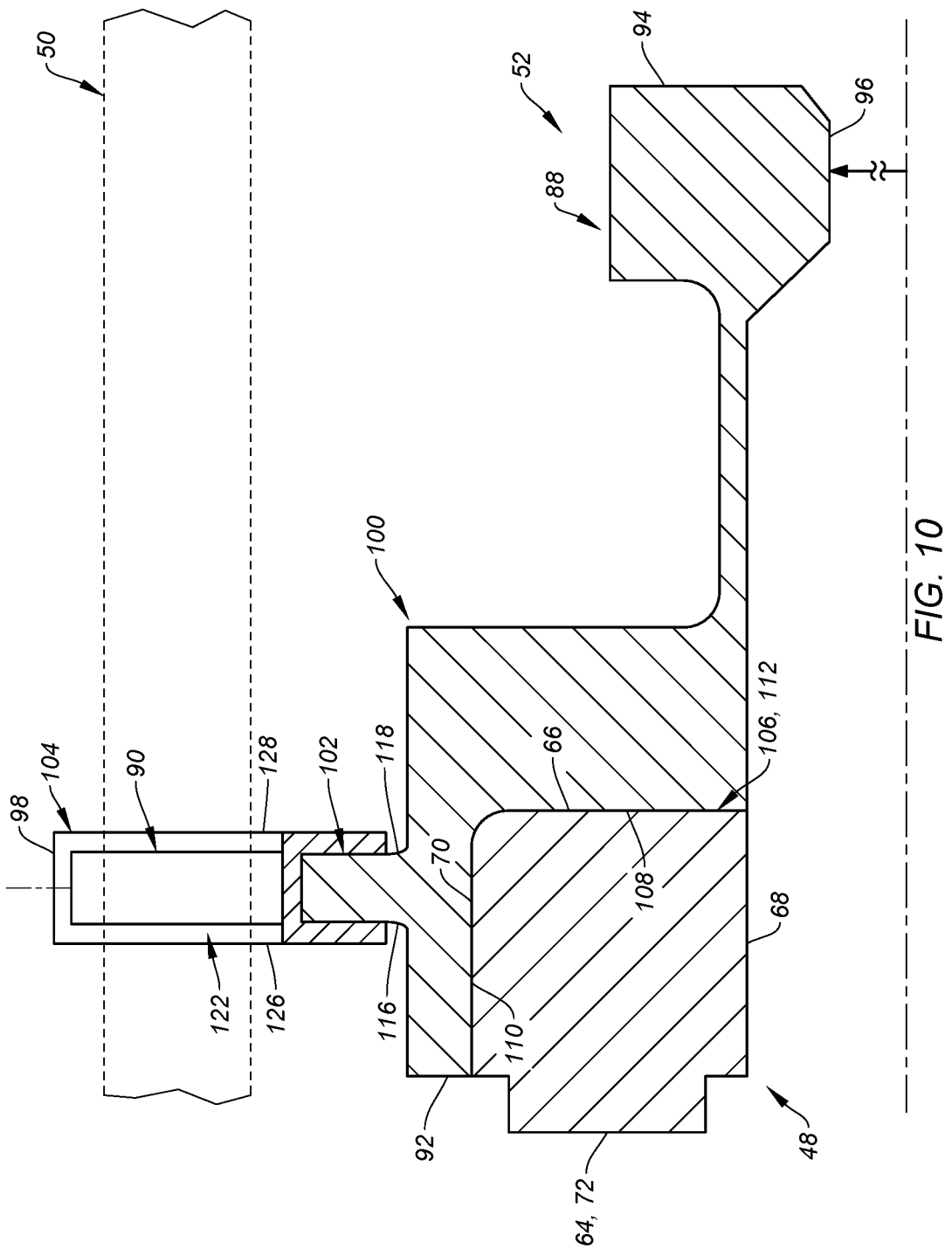
FIG. 10 is a partial first side sectional illustration of the assembly of FIG. 1.

Referring to FIG. 10, the carrier recess 106 forms a seal element receptacle 112 for the seal element 48. The seal element 48 of FIG. 10, for example, is seated in the seal element receptacle 112. The seal element second end 66 may axially engage (e.g., contact, abutted against, etc.) the axial end surface 108. The seal element outer side 70 radially engages the radial side surface 110. The seal element 48, for example, may be press fit into the carrier body 88 and its carrier base 100. The seal element 48 may thereby be mounted to and fixed with the seal carrier 52 and its carrier body 88. Of course, various other techniques such as bonding, mechanically retaining, etc. may also or alternatively be used to mount and fix the seal element 48 to the seal carrier 52 and its carrier body 88.

Referring to FIGS. 8 and 9, the carrier flange 102 projects radially out (e.g., in the radial outward direction) from the carrier base 100 to a distal radial outer end 114 of the carrier flange 102 (see FIG. 6). The carrier flange 102 extends axially between and to an axial first side 116 of the carrier flange 102 and an axial second side 118 of the carrier flange 102. Referring to FIG. 6, the carrier flange 102 extends circumferentially about (e.g., completely around) the axial centerline 38. The carrier flange 102 may thereby circumscribe the carrier base 100. The carrier flange 102 of FIG. 6 is configured with an undulating outer peripheral geometry at the flange outer end 114. The present disclosure, however, is not limited to such an exemplary arrangement. The flange outer end 114, for example, may alternatively have a circular outer peripheral geometry. In another example, the carrier flange 102 may be circumferentially interrupted; e.g., collectively formed by a plurality of (e.g., arcuate) flanges arranged circumferentially about the carrier body 88.

The carrier flange 102 of FIG. 6 is configured with a plurality of mount receptacles 120; e.g., slots, notches, etc. These mount receptacles 120 are arranged circumferentially about the axial centerline 38 in an array; e.g., a circular array. Each mount receptacle 120 extends laterally (e.g., circumferentially or tangentially) within the carrier flange 102. Each mount receptacle 120 projects radially (e.g., in a radial inward direction towards the axial centerline 38) into the carrier flange 102 from the flange outer end 114 partially towards (or to) the carrier base 100. Referring to FIGS. 8 and 9, each mount receptacle 120 extends axially through the carrier flange 102 between its opposing axial sides 116 and 118.

Referring to FIG. 6, the element mounts 104 are arranged circumferentially about the axial centerline 38 in an array; e.g., a circular array. Each element mount 104 is arranged with a respective one of the mount receptacles 120. A lateral center portion of each element mount 104 of FIG. 6, for example, is seated in the respective mount receptacle 120. Here, each element mount 104 is partially disposed in and lines the respective mount receptacle 120 to form a guide rail slot 122, or another type of aperture, in the carrier body 88 and its carrier flange 102. Referring to FIGS. 8 and 9, the carrier flange 102 may also (or alternatively) be seated in a channel 124 in each element mount 104. The carrier flange 102 of FIGS. 8 and 9, for example, projects radially into (e.g., in the radial outward direction) each mount channel 124. Each element mount 104 may be mechanically fastened (e.g., riveted, bolted, etc.), bonded and/or otherwise attached to the carrier flange 102 to fix the respective element mount 104 to the carrier flange 102 and, more generally, with the rest of the carrier body 88.

Each rail slot 122 extends axially through the respective element mount 104 (e.g., and the carrier elements 88 and 102) between and to opposing axial sides 126 and 128 of the respective element mount 104. Each rail slot 122 projects radially into the respective element mount 104 (e.g., and the carrier elements 88 and 102) from a distal radial outer end 130 of the respective element mount 104 (e.g., at the flange outer end 114) to a radial inner surface 132 of the respective element mount 104, which mount inner surface 132 forms a distal inner end of the respective rail slot 122. Referring to FIG. 6, each rail slot 122 extends laterally within the respective element mount 104 (e.g., and the carrier elements 88 and 102) between and to opposing lateral side surfaces 134 and 136 of the respective element mount 104, which mount side surfaces 134 and 136 form lateral sides of the respective rail slot 122.

Figure 11:
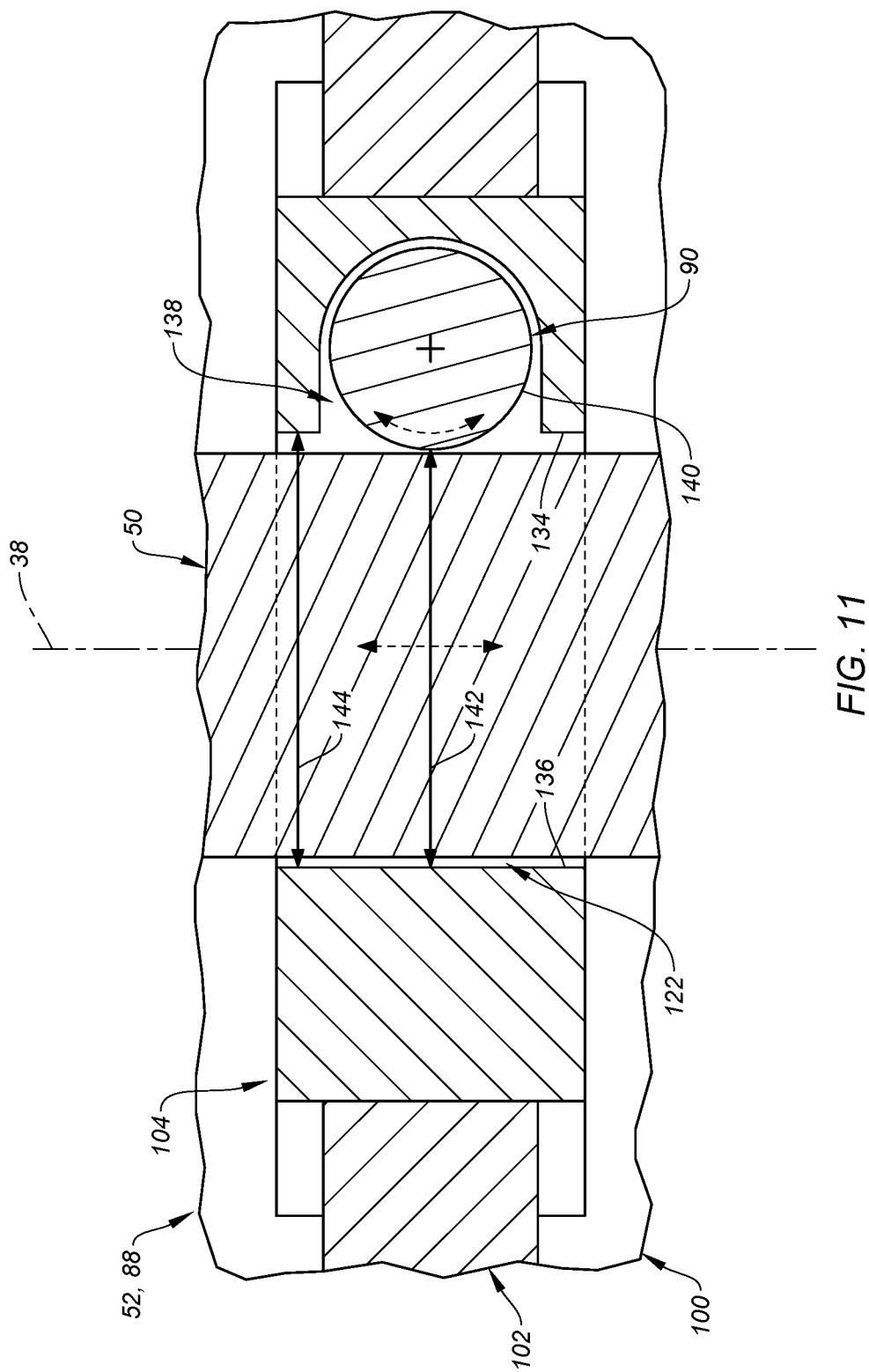
FIG. 11 is a partial inward view sectional illustration of the assembly of FIG. 1.
Figure 12:
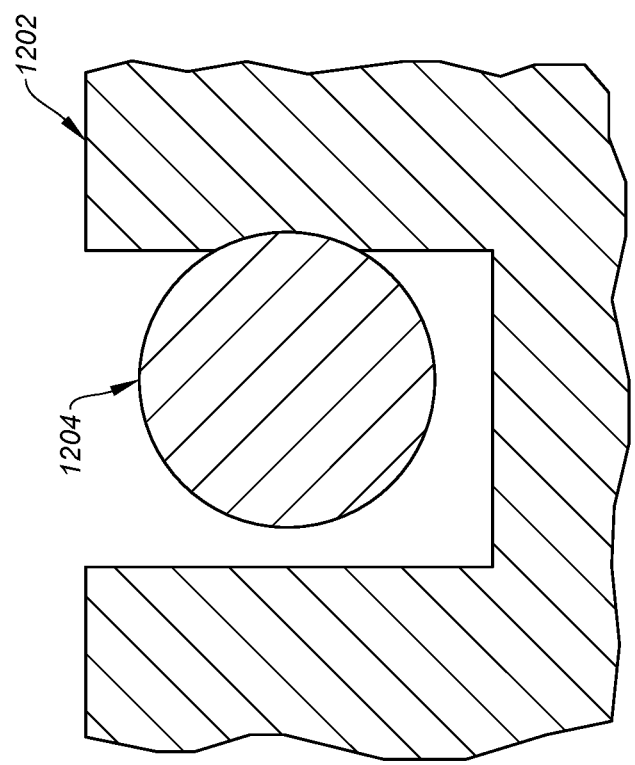
FIG. 12 is a partial cross-sectional illustration of a worn seal carrier mated with a guide rail.

Each element mount 104 rotatably supports a respective one of the rolling elements 90 at the first slot side; e.g., at the first mount side surface 134. Each element mount 104 also mounts the respective rolling element 90 to the carrier body 88 and, more particularly, to the carrier flange 102. Each rolling element 90 of FIG. 6, for example, is pivotally connected to the respective element mount 104 by a pin connection. Each rolling element 90 may be partially disposed within a rolling element receptacle 138 such as a cavity, a recess, an extension to the rail slot 122, etc. Referring to FIG. 11, each rolling element 90 may be configured as a cylindrical rolling element. Each rolling element 90 of FIG. 11, for example, has a cylindrical outer bearing surface 140. A segment (e.g., a major segment) of the rolling element 90 and its bearing surface 140 is disposed within the element receptacle 138. Another exposed segment (e.g., a minor segment) of the rolling element 90 and its bearing surface 140 is disposed outside of the element receptacle 138 and in the rail slot 122. With this arrangement, the exposed segment projects laterally into the respective rail slot 122 from the first slot side/the first mount side surface 134. An effective lateral width 142 of the rail slot 122 of FIG. 11 therefore extends laterally between and to the second mount side surface 136 and the bearing surface 140 of the exposed segment. This effective lateral width 142 is smaller than an actual lateral width 144 of the rail slot 122 of FIG. 11 extending laterally between and to the mount side surfaces 134 and The seal carrier 52 is mated with each of the guide rails 50. In particular, each guide rail 50 of FIG. 11 projects axially through the respective rail slot 122; see also FIGS. 6, 8 and 9. Here, each guide rail 50 is operable to laterally engage (e.g., contact) the respective rolling element 90 and its bearing surface 140 or the second mount side surface 136; e.g., during installation, maintenance, etc. However, during typical rotational equipment operation, the guide rail 50 of FIG. 11 may have a tendency to laterally engage the respective rolling element 90 and its bearing surface 140, rather than the second mount side surface 136, given the (e.g., one-way) rotation of the rotating assembly 24 and its rotating structure 36 (see FIG. 1). Each rolling element 90 may thereby function as a rolling element of a rolling element bearing between the respective guide rail 50 and the carrier body 88 and its respective element mount 104. With this arrangement, the seal carrier 52 translatably (e.g., slidably) couples the seal element 48 to the stationary structure 22 (see FIG. 1), for example, without any or significant rotation about the axial centerline 38. More particularly, the seal carrier 52 and, thus, the seal element 48 are operable to move axially along the axial centerline 38 as each rolling elements 90 rolls against and along the respective guide rail 50. Providing the rolling element 90/the rolling element bearing between the carrier body 88 and each guide rail 50 may reduce wear and/or friction losses. By contrast, referring to FIG. 12, sliding a seal carrier flange 1202 directly against a guide rail 1204 may wear away material of the seal carrier flange 1202 as well as introduce sliding friction into the system of FIG. 12.

Referring to FIG. 1, one or more spring elements 146 (e.g., coil springs) may be arranged between (a) the stationary structure 22 and its seal assembly support 34 and (b) the seal carrier 52 and its carrier flange 102. These spring elements 146 are configured to bias the seal carrier 52 and, thus, the seal element 48 away from the stationary structure 22 and towards the seal land 46. In particular, the spring elements 146 axially bias the seal element 48 against the seal land 46 such that the surfaces 62 and 72 axially abut and sealingly engage (e.g., contact) one another. The engagement between the seal element 48 and the seal land 46 may form a seal between the surfaces 62 and 72.

Figure 13:
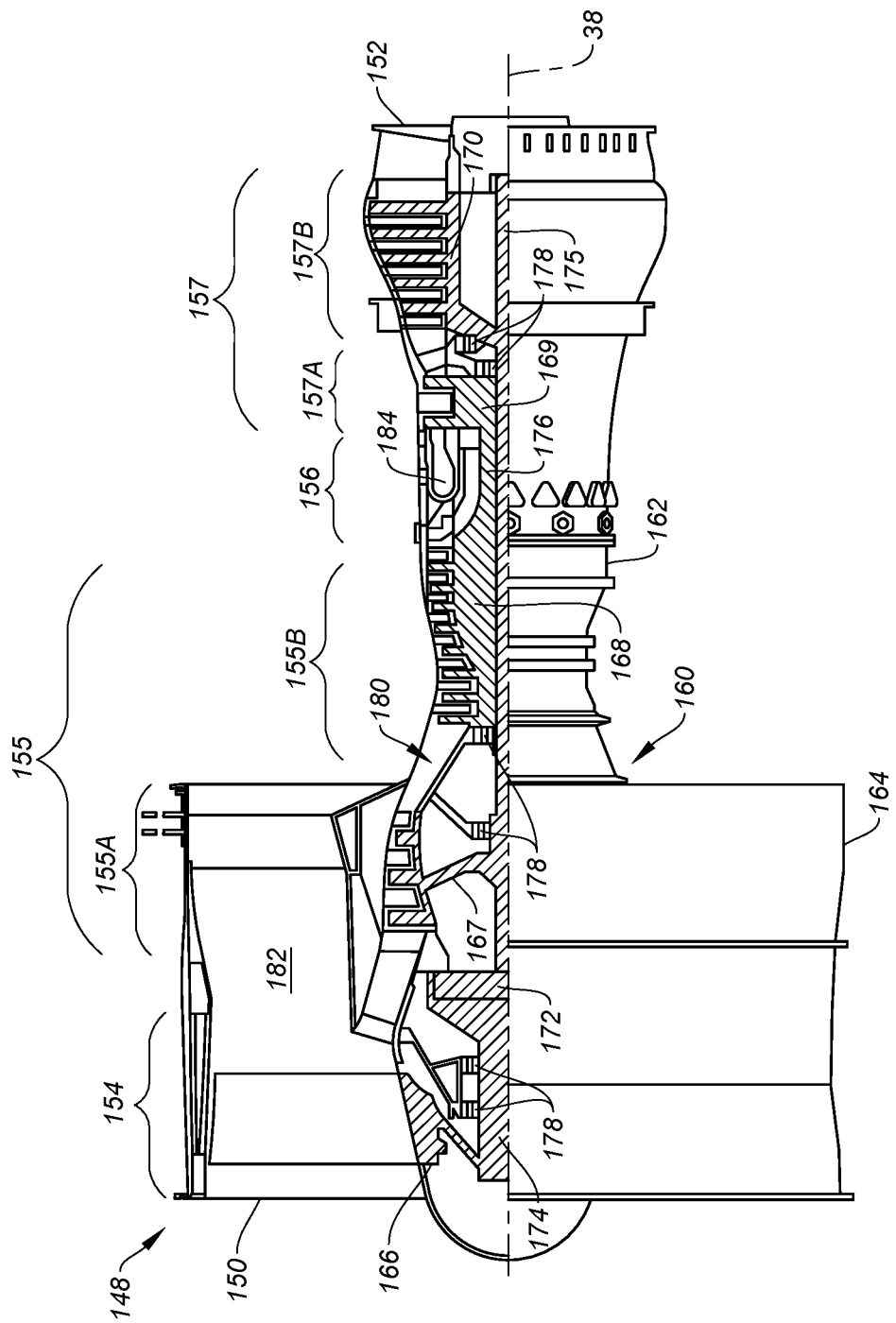
FIG. 13 is a side cutaway illustration of a geared turbine engine with which the assembly of FIG. 1 may be configured.

FIG. 13 is a side cutaway illustration of a geared turbine engine 148 with which the assembly 20 of FIG. 1 may be configured. The turbine engine 148 extends along an axial centerline (e.g., the centerline 38) between an upstream airflow inlet 150 and a downstream airflow exhaust 152. The turbine engine 148 includes a fan section 154, a compressor section 155, a combustor section 156 and a turbine section 157. The compressor section 155 includes a low pressure compressor (LPC) section 155A and a high pressure compressor (HPC) section 155B. The turbine section 157 includes a high pressure turbine (HPT) section 157A and a low pressure turbine (LPT) section 157B.

The engine sections 154-157B are arranged sequentially along the axial centerline 38 within an engine housing 160. This engine housing 160 includes an inner case 162 (e.g., a core case) and an outer case 164 (e.g., a fan case). The inner case 162 may house one or more of the engine sections 155A-157B; e.g., a core of the turbine engine 148. This inner case 162 may include or may be connected to the stationary structure 22 of FIG. 1. The outer case 164 may house at least the fan section 154.

Each of the engine sections 154, 155A, 155B, 157A and 157B includes a respective bladed rotor 166-170. Each of these bladed rotors 166-170 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 166 is connected to a geartrain 172, for example, through a fan shaft 174. The geartrain 172 and the LPC rotor 167 are connected to and driven by the LPT rotor 170 through a low speed shaft 175. The HPC rotor 168 is connected to and driven by the HPT rotor 169 through a high speed shaft 176. The shafts 174-176 are rotatably supported by a plurality of bearings 178; e.g., rolling element and/or thrust bearings. Each of these bearings 178 is connected to the engine housing 160 by at least one stationary structure 22 such as, for example, an annular support frame. The rotating structure 36 of FIG. 1 may be configured as any one of the shafts 174-176 or a component mounted thereto or otherwise rotatable therewith, and the bearing 26 of FIG. 1 may be configured as any one of the bearings 178.

During operation of the turbine engine 148 of FIG. 13, air enters the turbine engine 148 through the airflow inlet 150. This air is directed through the fan section 154 and into a core flowpath 180 and a bypass flowpath 182. The core flowpath 180 extends sequentially through the engine sections 155A-157B; e.g., the engine core. The air within the core flowpath 180 may be referred to as "core air". The bypass flowpath 182 extends through a bypass duct, which bypass flowpath 182 bypasses the engine core. The air within the bypass flowpath 182 may be referred to as "bypass air".

The core air is compressed by the LPC rotor 167 and the HPC rotor 168 and directed into a combustion chamber 184 of a combustor in the combustor section 156. Fuel is injected into the combustion chamber 184 and mixed with the compressed core air to provide a fuel-air mixture. This fuel-air mixture is ignited and combustion products thereof flow through and sequentially cause the HPT rotor 169 and the LPT rotor 170 to rotate. The rotation of the HPT rotor 169 and the LPT rotor 170 respectively drive rotation of the HPC rotor 168 and the LPC rotor 167 and, thus, compression of the air received from a core airflow inlet. The rotation of the LPT rotor 170 also drives rotation of the fan rotor 166, which propels the bypass air through and out of the bypass flowpath 182. The propulsion of the bypass air may account for a majority of thrust generated by the turbine engine 148, e.g., more than seventy-five percent (75%) of engine thrust. The turbine engine 148 of the present disclosure, however, is not limited to the foregoing exemplary thrust ratio.

While the rolling elements 90 are shown FIGS. 10 and 11 as cylindrical rolling elements, the rolling elements 90 may alternatively be configured as needle rolling elements. Each rolling element of FIGS. 14A and 14B, for example, is configured as a needle rolling element with a relatively large length to diameter ratio (as compared to a cylindrical rolling element, for example).

The assembly 20 may be included in various turbine engines other than the one described above as well as in other types of rotational equipment. The assembly 20, for example, may be included in a geared turbine engine where a geartrain connects one or more shafts to one or more rotors in a fan section, a compressor section and/or any other engine section. Alternatively, the assembly 20 may be included in a turbine engine configured without a geartrain; e.g., a direct drive engine. The assembly 20 may be included in a turbine engine configured with a single spool, with two spools (e.g., see FIG. 13), or with more than two spools. The turbine engine may be configured as a turbofan engine, a turbojet engine, a turboprop engine, a turboshaft engine, a propfan engine, a pusher fan engine or any other type of turbine engine. The present disclosure therefore is not limited to any particular types or configurations of turbine engines, nor to any particular types or configurations of rotational equipment as discussed above.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
   a guide rail;
   a seal carrier mated with and configured to translate along the guide rail, the seal carrier comprising a rolling element configured to engage and roll against the guide rail as the seal carrier translates along the guide rail;
   a seal element mounted to the seal carrier; and
   a seal land configured to rotate about an axis, the seal element configured to sealingly engage the seal land.

2. The assembly of claim 1, wherein the rolling element is disposed to a circumferential side of the guide rail about the axis.

3. The assembly of claim 1, wherein
   the seal carrier further comprises a carrier body and an aperture;
   the rolling element is rotatably attached to the carrier body, and the seal element is fixedly attached to the carrier body; and
   the guide rail projects axially through the aperture along the axis.

4. The assembly of claim 3, wherein
   the carrier body includes a base and a flange projecting radially out from the base; and
   the aperture extends axially through the flange along the axis.

5. The assembly of claim 4, wherein
   the carrier body further includes a mount;
   the mount rotatably supports the rolling element; and
   the mount is fixedly attached to the flange.

6. The assembly of claim 5, wherein the mount forms the aperture through the flange.

7. The assembly of claim 5, wherein
   the mount comprises a channel; and
   the flange projects radially into and is seated in the channel.

8. The assembly of claim 3, wherein
   the aperture comprises a slot;
   the slot extends axially through the carrier body along the axis;
   the slot projects radially into the carrier body towards the axis; and
   the slot extends laterally within the carrier body.

9. The assembly of claim 3, wherein
   a bearing surface of the rolling element projects laterally into the aperture; and the bearing surface is configured to laterally contact the guide rail.

10. The assembly of claim 9, wherein the bearing surface is a cylindrical surface of the rolling element.

11. The assembly of claim 3, wherein
the guide rail is disposed laterally between the rolling element and a side surface of the carrier body; and
the guide rail is operable to laterally contact the side surface of the carrier body.

12. The assembly of claim 1, further comprising:
a plurality of guide rails comprising the guide rail, the plurality of guide rails arranged circumferentially about the axis;
the seal carrier mated with and configured to translate along the plurality of guide rails;
the seal carrier further comprising a plurality of rolling elements; and
the plurality of rolling elements comprising the rolling element, and each of the plurality of rolling elements configured to engage and roll against a respective one of the plurality of guide rails as the seal carrier translates along the plurality of guide rails.

13. The assembly of claim 1, wherein the seal element comprises a carbon seal element.

14. The assembly of claim 1, further comprising a spring element engaging the seal carrier and configured to bias the seal element against the seal land.

15. The assembly of claim 1, further comprising:
a stationary structure of an engine, the guide rail fixed to the stationary structure; and
a rotating structure of the engine, the seal land fixed to the rotating structure;
wherein the rotational equipment comprises the engine.

16. An assembly for rotational equipment, comprising:
a guide rail;
a seal carrier extending circumferentially about an axis, the seal carrier comprising a rolling element bearing, the seal carrier mated with the guide rail through the rolling element bearing, and the seal carrier configured to translate axially along the guide rail;
a seal element extending circumferentially about the axis, the seal element mounted to the seal carrier; and
a seal land extending circumferentially about and configured to rotate about the axis, the seal element configured to axially engage the seal land.

17. The assembly of claim 16, wherein the rolling element bearing comprises a cylindrical rolling element configured to engage and roll against a lateral side of the guide rail.

18. An assembly for rotational equipment, comprising:
a seal carrier extending circumferentially around an axis, the seal carrier including a receptacle, a plurality of slots, a base, a flange, a plurality of mounts and a plurality of rolling elements;
the receptacle extending axially into the base;
the plurality of slots arranged circumferentially about the axis, each of the plurality of slots extending axially through the flange;
the flange projecting radially out from the base in a direction away from the axis;
each of the plurality of mounts fixed to the flange and rotatably supporting a respective one of the plurality of rolling elements; and
each of the plurality of rolling elements projecting partially laterally into a respective one of the plurality of slots; and
a seal element extending circumferentially around the axis, the seal element seated in the receptacle and fixed to the base.

19. The assembly of claim 18, further comprising:
a plurality of guide rails;
each of the plurality of guide rails projecting axially through a respective one of the plurality of slots, and each of the plurality of guide rails laterally contacting a respective one of the plurality of rolling elements; and
the plurality of rolling elements configured to guide axial translation of the seal carrier along the plurality of guide rails.

20. The assembly of claim 18, further comprising:
a bladed rotor;
a rotating structure coupled to and rotatable with the bladed rotor; and
a seal land mounted onto the rotating structure, the seal element configured to axially engage and form a seal with the seal land.

* * * * *